Figure 3:
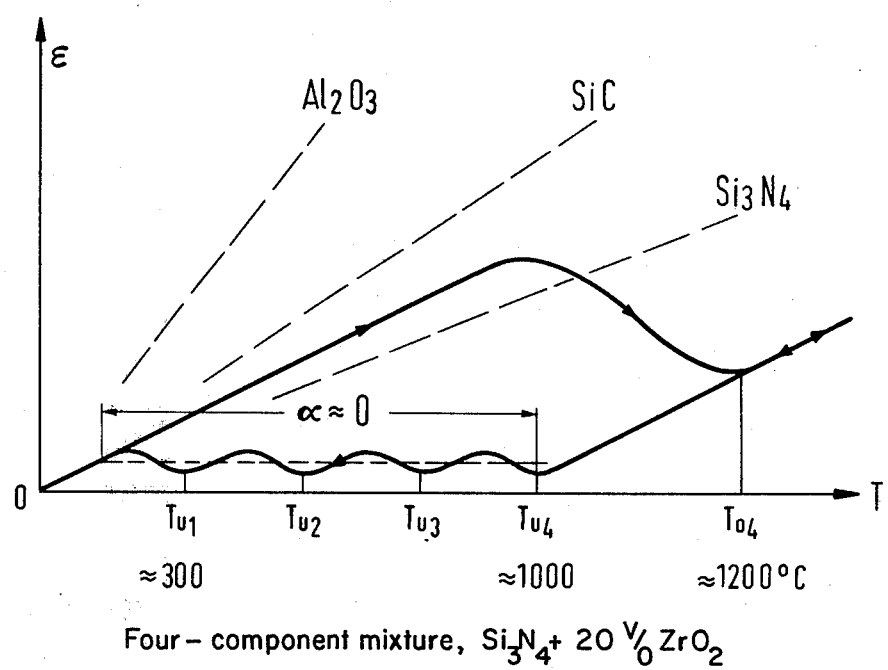

United States Patent [19]

Claussen et al.

[11] 4,322,249
[45] Mar. 30, 1982

[54] PROCESS FOR THE PREPARATION OF DISPERSION CERAMICS

[75] Inventors: Nils Claussen, Leonberg; Jürgen Jahn, Stetten; Günter Petzow, Leinfelden-Echterdingen, all of Fed. Rep. of Germany

[73] Assignee: Max Planck Gesellschaft, Gottingen, Fed. Rep. of Germany

[21] Appl. No.: 167,899

[22] Filed: Jul. 14, 1980

Related U.S. Application Data

[63] Continuation of Ser. No. 961,442, Nov. 16, 1980, abandoned.

[30] Foreign Application Priority Data

Nov. 21, 1977 [DE] Fed. Rep. of Germany ....... 2751938

[51] Int. Cl.$^3$ .................... C04B 35/00; C04B 35/10; C04B 35/48; C04B 35/52
[52] U.S. Cl. ...................... 501/88; 264/332; 501/97; 501/105; 501/152; 501/153; 501/154
[58] Field of Search .................. 106/57, 73.4, 73.5, 106/44, 55; 264/332

[56] References Cited

U.S. PATENT DOCUMENTS

| | | | |
|---|---|---|---|
| 3,247,000 | 4/1966 | Taylor | 106/57 |
| 3,740,340 | 6/1973 | Riley et al. | 106/57 |
| 3,916,585 | 11/1975 | Barks | 106/57 X |
| 4,073,845 | 2/1978 | Buljan et al. | 106/73.5 X |
| 4,125,407 | 11/1978 | Ueno | 106/57 |
| 4,218,253 | 8/1980 | Dworak et al. | 106/73.4 X |

FOREIGN PATENT DOCUMENTS 2549652  5/1977  Fed. Rep. of Germany ........ 106/65

OTHER PUBLICATIONS

Claussen, N. "Fracture Toughness of Al$_2$O$_3$ with an Unstabilized ZrO$_2$ Dispersed Phase" J. Am. Cer. Soc. 59 (1976) pp. 49–51.
Claussen, N. et al. "Toughening of Ceramic Composites by Oriented Nucleation of Microcracks" J. Am. Cer. Soc. 59, (1976) pp. 457–458.

Primary Examiner—Helen M. McCarthy
Attorney, Agent, or Firm—Sprung, Felfe, Horn, Lynch & Kramer

[57] ABSTRACT

In a process for the production of dispersion ceramics by sintering or hot pressing of a mixture of a matrix-forming ceramic material and of at least one ceramic embedment material dispersible therein which at the sintering temperature of the ceramic and at room temperature is present in different enantiotropic solid modifications of different densities, a ceramic embedment material is employed which is divided into at least two groups of different, substantially uniform particle sizes, each group having different lower phase-transition temperatures.

9 Claims, 4 Drawing Figures

Four-component mixture, Si$_3$N$_4$ + 20 V/o ZrO$_2$

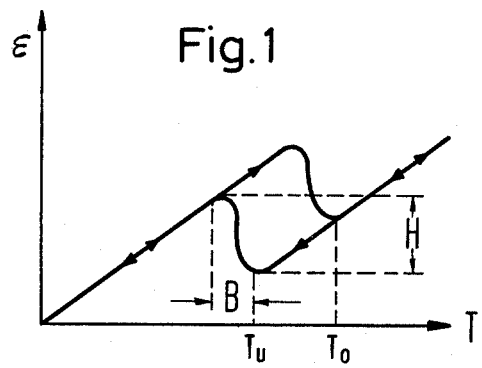
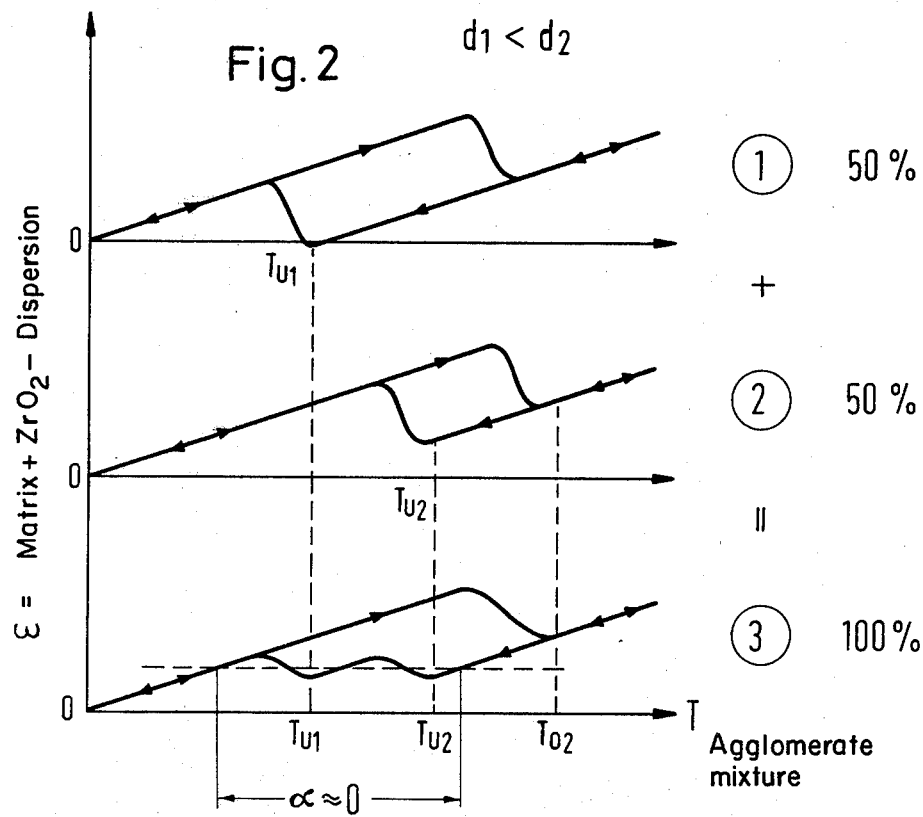

Four-component mixture, $Si_3N_4 + 20 \, V/o \, ZrO_2$

Dependence of Reverse Transition Temperatures Tu on the Zirconium–Dioxide Particle Diameter in an Aluminum–Oxide Matrix

PROCESS FOR THE PREPARATION OF DISPERSION CERAMICS

This is a continuation, of application Ser. No. 961,442, filed Nov. 16, 1980, now abandoned.

The invention relates to a process for the production of high-strength dispersion ceramics with improved resistance to sudden temperature changes.

From published unexamined German Patent application (DT-OS) No. 25 49 652, formed ceramic bodies of high fracture strength and a process for their production are known in which a mixture of a ceramic material forming a matrix and at least one ceramic embedment material dispersible therein is sintered or hot-pressed to formed ceramic bodies, the ceramic embedment material used being one which at the calcining temperature of the ceramic material and at room temperature is present in different enantiotropic solid modifications of different densities. The formed ceramic bodies produced by this known process, in which preferably unstabilized zirconium dioxide is used as ceramic embedment material and aluminum oxide as matrix-forming ceramic material, are permeated in high density by extremely fine microcracks, which imparts to them high fracture strength, resistance to sudden temperature changes and impact strength as well as high mechanical strength. In these known ceramics the fine microcracks are due to the fact that when the formed bodies are cooled from the sintering or hot-pressing temperature the lower phase-transition temperature of the embedment material is udershot, with the tetragonal zirconium-dioxide modification which is stable above the transition temperature then changing into the monoclinic modification which is stable below the phase-transition temperature, this resulting in a change in volume due to the different densities of the modifications, and hence in stresses and cracks.

In the case of zirconium dioxide, the transformation of the denser tetragonal high-temperature modification to the monoclinic modification which is stable at room temperature results in an expansion of the embedded particles, and thus in an expansion of the body as a whole. The tangential tensile stresses produced in the matrix by this expansion, and the corresponding radial compressive stresses, account for the formation of the strength-improving cracks. However, in many cases it is desirable to reduce or even to avoid the expansion of the ceramic body caused by the phase change, but this is not possible in the case of the known process.

The invention has as its object to provide a process for the production of dispersion ceramics in which the stresses due to the phase change of two enantiotropic modifications of a ceramic embedment material can be utilized in the same way as in the process known from DT-OS No. 25 49 652 for the formation of microcracks, and thus for increasing the strength and the resistance to sudden temperature changes, while at the same time largely suppressing the expansion of the body as a whole which normally is associated with the phase change.

In accordance with the invention, this object is accomplished, in a process for production of dispersion ceramics by sintering or hot-pressing of a mixture of a matrix-forming ceramic material and of a ceramic embedment material dispersible therein which at the calcining temperature of the ceramic material and at room temperature is present in different enantiotropic solid modifications of different densities, by employing the ceramic embedment material in the form of particles having different lower phase-transition temperatures.

The lower phase-transition temperature of the ceramic embedment material in accordance with the invention is directly dependent on the size of the particles. In the case of a given matrix material and of a given embedment material, the dependence of the lower phase-transition temperature on the particle size can readily be specified. However, independently of the absolute size of the embedment particles, it is important that the particle size extend over a considerable range of sizes. The size ratio of the smallest particles to the largest particles of the embedment material should preferably be at least 1:10, that is to say, the largest particles present in an appreciable amount should be at least ten times as large as the smallest particles present in an appreciable amount. Within this size range of 1:10, the particles should be distributed in such a way that the amount of the individual size fractions do not differ too greatly from one another. This can be accomplished through a size distribution of the particles that is as uniform as possible, and also by seeing to it that several particle groups are made up of particles of relatively slight size differences which do not substantially exceed the ratio of 1:3. However, the invention can be practiced also with size compositions which differ from these preferred ratios, the only condition being that through the size distribution and the different lower phase-transition temperatures resulting therefrom the coefficient of expansion of the ceramic to be kept as close to zero as possible in the particular temperature range of interest.

The absolute size of the embedment particles as well as their size distribution will depend on both the matrix material and the embedment material. In general, however, the particle size will range from 0.1 to 5$\mu$, and preferably from 0.1 to 2$\mu$.

In preferred embodiments of the invention, the ceramic embedment material is employed in the form of agglomerates having different lower phase-transition temperatures, aluminum oxide, silicon carbide or silicon nitride being used as matrix-forming material, and unstabilized zirconium dioxide or hafnium dioxide as ceramic embedment material.

The process in accordance with the invention makes it possible, through proper choice of the nature and size of the particles employed as embedment material, to keep the coefficient of expansion of the dispersion ceramics produced thereby very small, or even substantially equal to zero, in the critical temperature range in which structure-damaging thermal-shock stresses may arise. Thus the process in accordance with the invention permits securing in each case a very definite critical temperature range, thereby allowing the structure of a ceramic material to be designed in the truest sense for particular thermal-shock situations.

Figure 4:
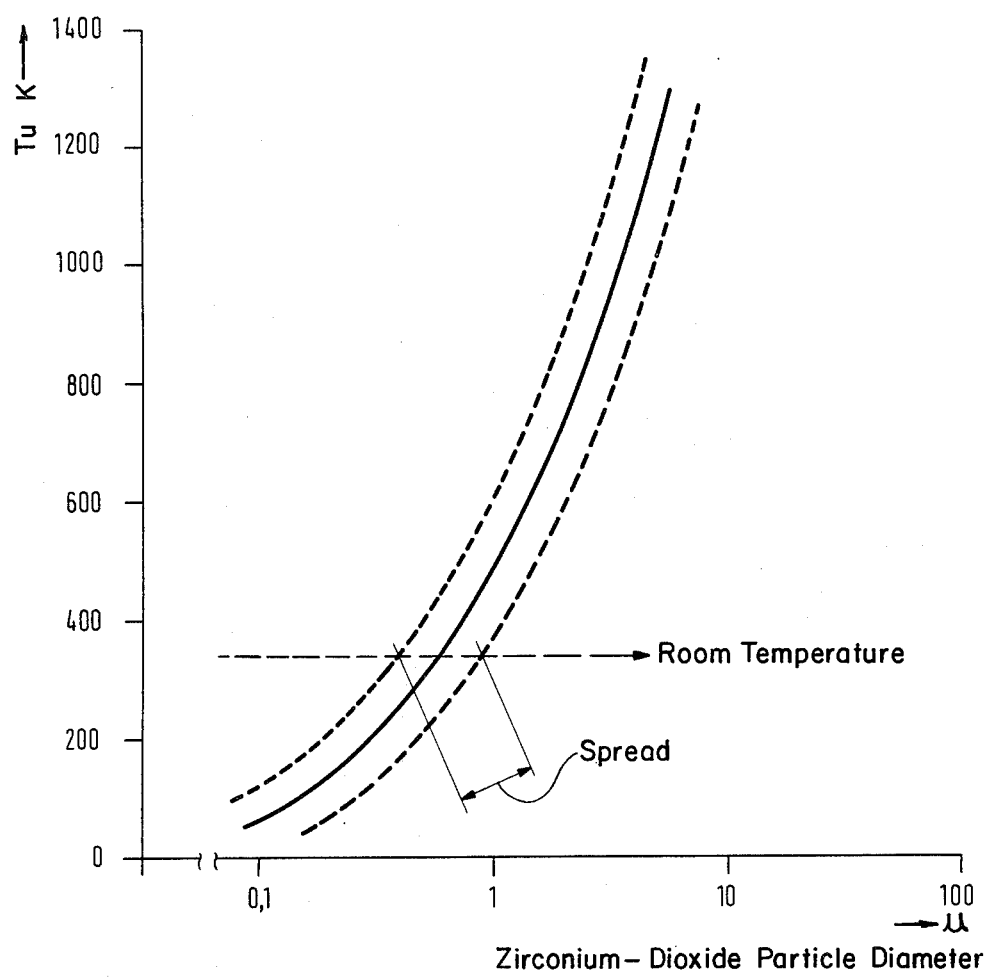

The invention is explained below in greater detail with reference to the drawings, where FIG. 1 is an $\Sigma/T$ diagram plotting the expansion of a formed ceramic body produced by the process known from DT-OS No. 25 49 652 against temperature;

FIGS. 2 and 3 are $\Sigma/T$ diagrams for dispersion ceramics produced in accordance with the invention; and FIG. 4 is a diagram which illustrates the relationship between particle diameter and $T_u$.

FIG. 1 illustrates the expansion E of a formed ceramic body produced by the known process, and consisting of an aluminum-oxide matrix and zirconium dioxide particles embedded therein, as a function of temperature T. At about 1000° C., which is the upper transition temperature $T_o$, the embedded zirconium dioxide changes from the monoclinic modification which is stable at room temperature to the denser tetragonal modification. The formed body is produced by sintering or hot-pressing at elevated temperatures so that the particles are present in the denser tetragonal modification. As the formed body is cooled from calcining temperature, the shape of the curve changes (hysteresis); the phase transformation now occurs at the lower transition temperature $T_u$. $T_u$ is a function of the particle size (diameter) d as well as the nature of the matrix. However, the upper transition temperature $T_o$ is influenced by these factors much less than the lower one. The temperature range B within which the reverse transformation occurs is a function of particle-size distribution, and the extent or height H of the transformation is largely determined by the volume proportion v of the zirconium-dioxide particles in the matrix. It has now been found that with decreasing particle size the lower transition temperature $T_u$ is shifted to lower temperatures; thus, the smaller the diameter d of the particles of the ceramic embedment material, the lower $T_u$.

FIG. 2 is an $\Sigma/T$ diagram of a dispersion ceramic produced in accordance with the invention (3) and of two ceramics produced by the known process (1) and (2). The zirconium dioxide particles of the dispersion ceramic (1) illustrated in the upper diagram are smaller than those of the ceramic (2) illustrated in the middle diagram, i.e., $d_1 < d_2$. The lower transition temperature $T_{u1}$ of ceramic (1) is correspondingly lower than $T_{u2}$ of ceramic (2). Now when agglomerates of the first dispersion (1) are mixed with equal amounts of agglomerates of the second dispersion (2), the transition temperatures in such a duplex ceramic (3) are "added" in the manner illustrated in the lower diagram. The coefficient of expansion a then is approximately equal to zero within the temperature range indicated. Thus, in the case of such a composition corresponding to agglomerate mixture (3), a formed ceramic body whose critical thermal stresses would, under certain thermal-shock conditions, lie within this temperature range would be unable to break, provided that its operating temperature is always above $T_{o2}$, that is to say, in the range in which the particles are present in their tetragonal modification.

FIG. 3 is an $\Sigma/T$ diagram for a dispersion ceramic produced in accordance with the invention from a mixture of four separately prepared agglomerates of a silicon-nitride matrix with 20% by volume each of zirconium dioxide. The lower transition temperature $T_{u1}$ of agglomerate (1) is about 300° C. and that of agglomerate (4) about 1000° C., the upper transition temperature $T_{o4}$ being about 1200° C. It is apparent from the diagram that when silicon nitride is used as matrix a very wide temperature range is obtained within which the coefficient of expansion a is approximately equal to zero. Such a dispersion ceramic is suited for use as a high-temperature gas-turbine element in which the operating temperature is above about 1200° C. ($T_{o4}$). The broken lines give the expansion ratios for pure silicon nitride, silicon carbide and aluminum oxide. Since the critical temperature ranges in which structure-damaging thermal-shock stresses may arise are usually fairly narrow under practical conditions, ceramics with a high coefficient of expansion a can also be made more stable to thermal shock in accordance with the invention.

FIG. 4 illustrates the dependence of the lower phase-transition temperature $T_u$ on the particle size in the case of an aluminum-oxide matrix with embedded zirconium-dioxide particles. The particle diameter is plotted against $T_u$, specified in degrees Kelvin.

The process in accordance with the invention can be practiced in such a way that first discrete mixtures of powdered matrix-forming ceramic material and powdered ceramic embedment material are prepared, the ceramic embedment material in each of these individual mixtures having a substantially uniform particle size, and hence a substantially uniform lower transition temperature, the average particle size and lower transition temperature of the ceramic embedment material differing, however, from one mixture to the next. The individual mixtures so prepared are then blended and pressed to give formed bodies by sintering or hot-pressing at a temperature which is above the phase-transition temperature $T_o$ of the ceramic embedment material. Instead of starting from discrete powder mixtures, the individual powder mixtures may first be converted to spherical agglomerates by methods which as such are known. (See Zeitschrift für Werkstofftechnik, 1973, pp. 148–156.) The individual agglomerates are then mixed together and pressed in the same way as the powder mixtures to give formed bodies.

However, the process in accordance with the invention may also be practiced in such a way that an individual mixture having a very broad particle-size distribution is produced from the matrix-forming ceramic material and the ceramic embedment material so that the reverse transformation of the tetragonal modification to the monoclinic modification proceeds horizontally over a wide range ($a=0$). With the latter method, the particle-size distribution is brought about by grinding the starting material for different lengths of time in an attritor (planetary mill).

Because of their high mechanical strength and their high resistance to sudden temperature changes, and because of the fact that the expansion of the dispersion ceramics produced in accordance with the invention is almost completely surpressed over a definite critical temperature range, said dispersion ceramics may be used to advantage wherever operating temperatures prevail which are above the upper phase-transition temperature, or wherever it is important to eliminate the risk of breakage in sudden quenching or normal cooling.

Further details of the invention will become apparent from the examples in conjunction with the drawing and the claims.

EXAMPLE 1

Silicon-nitride powder is ground in an attritor for a total of 11.5 hr. with 25% by volume of a zirconium-oxide powder of average fineness whose particles have an average diameter of about 1μ, the following procedure being used to obtain a reverse-transition curve that is as flat as possible: The silicon-nitride powder is first ground for 6 hr. with 5% by volume of zirconium-dioxide powder, following which another 5% by volume of zirconium dioxide is admixed thereto, and still another 5% by volume of zirconium dioxide after 9 hr. and after 10.5 hr. as well as after 11 hr. 20 min. The mixing grinding is ended 10 min. after the last addition of zirconium-dioxide. Since some of the zirconium-dioxide particles are ground more finely than the others, a broad particle-size distribution and thus also a broad reverse transformation curve are obtained. The lower transition temperature $T_u$ of the mixture so produced is about 730° C., and the upper transition temperature ($T_o$) about 1200° C.

EXAMPLE 2

Silicon-nitride powder is ground for 2 hr. with 30% by volume of fine zirconium-dioxide powder whose particles have an average diameter of 0.3μ, in an attritor. The lower transition temperature $T_u$ is about 750° C., the upper transition temperature ($T_o$) about 1000° C.

EXAMPLE 3

Aluminum oxide powder (average particle diameter, 0.5μ) is wet-ground in an attritor for 18 hr. with 20% by volume of zirconium dioxide powder, ethanol being used as the mixing liquid. The lower transition temperature $T_u$ is about 290° C.

EXAMPLE 4

A mixture consisting, as in Example 3, of aluminum oxide and 20% by volume of zirconium dioxide is subjected, under otherwise identical conditions, to mixing grinding for 2 hr. only. Because of the short mixing time, which results in a relatively large particle size, the lower transition temperature $T_u$ is above 600° C.

The mixtures from Examples 3 and 4 are separately dry-agglomerated for 10 hr. to an agglomerate size of about 100μ.

The mixtures produced in accordance with Examples 1 and 2 as well as a 50:50 mixture of the agglomerates produced in accordance with Examples 3 and 4 are then hot-pressed for 1 hr. at 1500° C. The ceramics so produced exhibit in the range of their particular lower transition temperatures a coefficient of expansion that is about one-half that of formed ceramic bodies made of pure aluminum oxide or silicon nitride.

We claim:

1. In a process for the production of dispersion ceramics by sintering or hot-pressing a mixture of a matrix-forming ceramic material, the improvement comprising the steps of dispersing throughout said matrix forming material at least one ceramic embedment material, the particles of which range in size from 0.1 to 5μ, which is present in different enantiotropic solid modifications of different densities at different predetermined temperatures and in the form of particles having a predetermined distribution of differently sized particles whereby the particles have a predetermined distribution of different lower phase-transition temperature $T_u$.

2. Improvement as claimed in claim 1, wherein the ceramic embedment material is employed in the form of agglomerates having different lower phase-transition temperatures $T_u$.

3. Improvement as claimed in claim 1 wherein aluminum oxide, silicon carbide or silicon nitride is employed as the matrix-forming ceramic material.

4. Improvement as claimed in claim 1 wherrein unstabilized zirconium dioxide or hafnium dioxide is employed as ceramic embedment material.

5. Improvement as claimed in claim 1 wherein the size ratio of the smallest particles to the largest particles of the ceramic embedment material is at least 1:10.

6. Process as recited in claim 1, wherein ceramic embedment material is used comprising a mixture of at least two agglomerated mixtures of matrix material and embedment material, wherein the embedment material of each agglomerated mixture has a different, substantially uniform particle size.

7. In a dispersion ceramic material of the type formed of aluminum oxide, silicon carbide, or silicon nitride and having an embedment material of unstabilized zirconium dioxide or hafnium dioxide powder dispersed therethrough, the improvement comprising said embedment material, the particles of which range in size from 0.1 to 5μ, having first and second approximately equal volume portions of particles with a predetermined average size variation ratio of the particles in said first portion to said second portion of at least 1:10 to give the ceramic material enhanced thermal shock resistance.

8. The ceramic material of claim 7 wherein there are intermediate portions of embedment material particles intermediate in size to the particles of said first and second portions, said intermediate portions being of approximately the same volume as said first or second portions.

9. Improvement as claimed in claim 1, wherein unstabilized zirconium dioxide is employed as the ceramic embedment material.

* * * * *